Jan. 10, 1950  E. M. BATES ET AL  2,494,375
ILLUMINATED COMPACT
Filed March 24, 1948
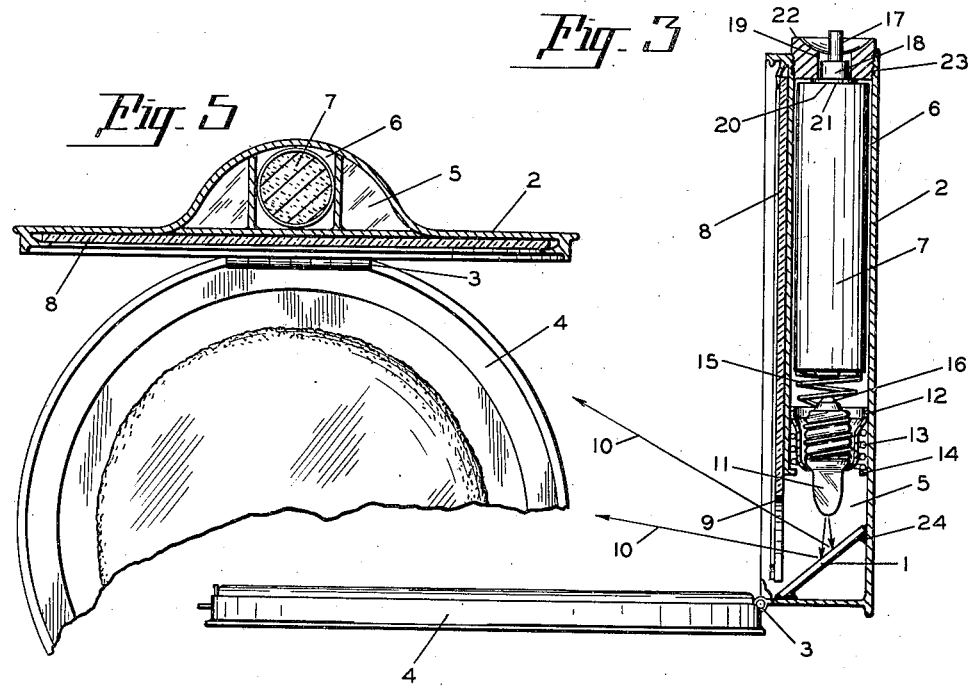
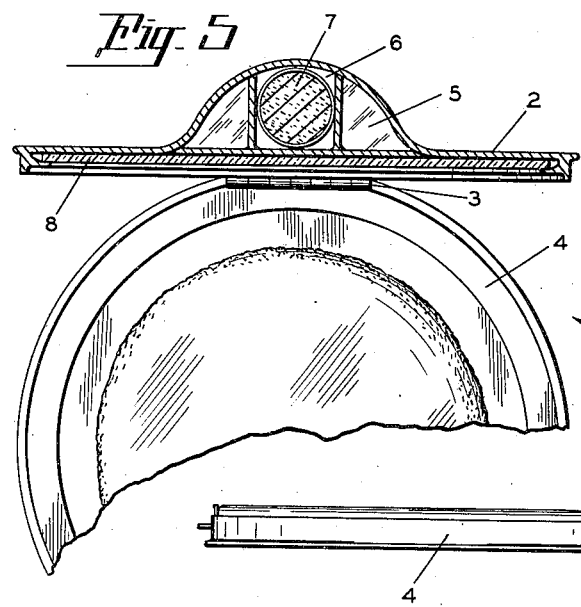
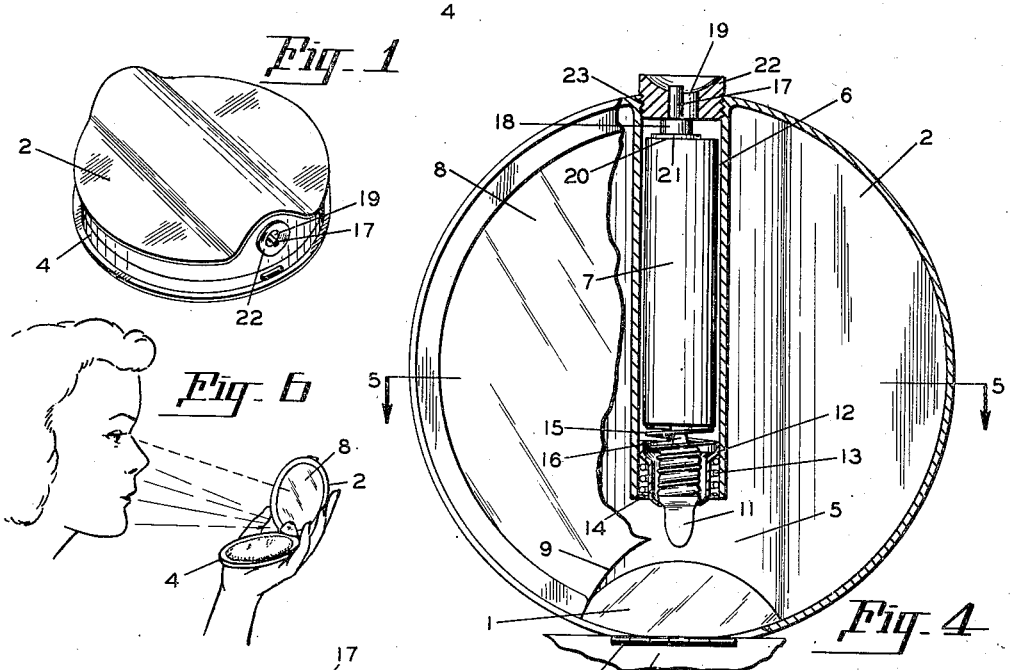
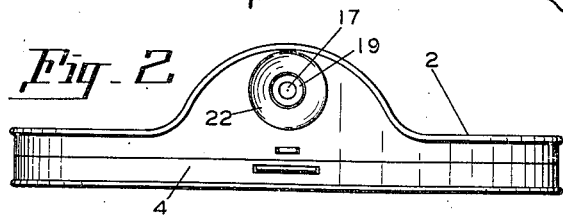
INVENTOR.
EARL M. BATES
HANNAH BATES
BY
ATTORNEY Patented Jan. 10, 1950

2,494,375

UNITED STATES PATENT OFFICE 2,494,375

ILLUMINATED COMPACT

Earl M. Bates and Hannah Bates, Chehalis, Wash.

Application March 24, 1948, Serial No. 16,726

3 Claims. (Cl. 132—83)

This invention relates to compacts and is particularly adapted to make-up compacts.

Heretofore in the use of make-up compacts the make-up operation had to be performed adjacent outside light sources, or in the case of compacts where light sources were present within the compact this light source would shine directly in the eyes of the operator.

The primary object of our invention is to provide a source of light within the compact that will be projected at an angle to the line of vision of the operator who will not be blinded by the rays of light from the compact.

A further object of our invention is to provide a source of light from a standard flashlight unit, so the parts can be obtained easily for the same.

And a still further object of our invention is to provide a switching device that cannot accidentally be turned on, thereby running down the battery of the lighting unit.

Figure 1 is a perspective plan view of our new and improved make-up compact.

Figure 2 is a front elevation of Figure 1.

Figure 3 is a side partially in section view, illustrating the lid of the compact in open position.

Figure 4 is a view looking into the mirror partially in section for convenience of illustration.

Figure 5 is a fragmentary detail view taken on line 5—5 of Figure 4.

Figure 6 is an illustration of the use of our new and improved make-up compact.

Referring more specifically to the drawings:

A make-up compact to overcome the objections heretofore mentioned and to carry out the objects of our invention must reflect the rays of light at an angle to the mirror into which the operator is viewing, so that these light rays will completely illuminate the operator's face.

This is accomplished by mounting a reflecting light mirror 1 within the lid 2. The lid 2 is hingedly mounted at 3 to the usual compact base 4, the said mirror is mounted within the enlarged space 5 of the bottom portion of the lid at an angle to the lid, best illustrated in Figure 3. The lid has an enlarged compartment 6 in which a storage battery 7 is carried.

Mounted to the face of the lid 2 is a mirror 8, which corresponds to the regular mirror associated with compacts, but is cut away at 9 so that the light reflecting mirror 1 may reflect the light rays 10 therethrough from the light globe 11.

The light globe 11 rests within the thimble 12, which in turn rests upon the spring 13 bearing on the ledge 14 of the chamber 6. A spring 15 separates the battery 7 from the contact point 16 of the light globe 11 maintaining an open circuit when the compact is not being used.

We will now describe the switch mechanism for closing the electric circuit through the globe 11 and the battery 7. A plunger 17, having an enlarged portion 18 operating within the opening 19 of the cup 22 bears against the battery at 20. When the plunger 17 is forced down by the finger of the operator from the position shown in Figure 3 to that shown in Figure 4, then moved sidewise of the opening 19 the enlarged portion 18 bears against the underside of the opening 19, the battery will be held against the contact point, spring tension 15 and the tension of the spring 13 insuring an electric circuit through the globe 11.

The spring 13 is slightly stronger than the spring 15, therefore after the contact has been made between the battery and the globe the spring 13 will maintain this connection complete and when the battery is relieved by the switch plunger 17 the spring will force the battery to the position shown in Figure 3. In Figure 4 the battery has been lowered by the plunger 17 closing the electric circuit through the core of the battery into the point 16 of the globe 11 through the globe into the spring 15 and to the outer casing of the battery.

By aligning the plunger 17 with the center of the hole the enlarged portion 18 will again reenter the said opening 19, allowing the battery to raise to the position shown in Figure 3, breaking the electric circuit. This plunger may be just momentarily brought in contact and held there, but due to its construction it is not apt to be operated accidently without deliberate action. The action of the spring 13 against the thimble 12 and the globe 11 insures constant contact between the battery and the globe 11 when the enlarged portion 18 is bearing on the underside of the hole 19.

A flange 21 is formed integral with the enlarged portion 18 and prevents the plunger from dropping out through the opening 19 and provides a good mechanical contact against the end of the battery 21 maintaining the plunger in alignment with said battery. The battery and switch assembly is held within the chamber 6 by the threaded closure 22 which is threaded into the chamber at 23. We do not wish to be limited to the exact mechanical structure of the lighting unit, as other forms of embodiment may be used carrying out the objects of our invention.

In the operation of our new and improved make-up compact the light from the globe 11 strikes the reflecting mirror as indicated by the arrows in Figure 3 and reflected by the rays 10 at an angle to the line of vision to the operator looking into the mirror 8. This completely lights up the face, but at the same time in no way blinding the vision of the operator.

We do not wish to be limited to a flat reflecting mirror 1, as this mirror may be convex or concave in shape to either constrict the light or to spread the light out depending upon the type of mirror which will be most efficient.

We have illustrated the mirror glued in place at 24, although we do not wish to be limited to mounting the mirror in this fashion, as our invention resides in the fact that we reflect the light at an angle to the line of vision.

From the above description and disclosure of our drawings, we have pointed out the advantages of our compact over compacts commonly in use, namely that we light up the face of the operator and at the same time we do not blind the line of vision by direct rays of light.

What we claim as new is:

1. A compact comprising a container portion and a mirror supporting cover hinged thereto, a compartment extending transversely of said cover behind said mirror, an opening through said mirror into said compartment, a thimble within said compartment and supporting a light bulb behind said mirror adjacent said opening, a battery within said compartment behind said thimble, a spring seated against said battery casing and coiled about the threaded base of said light bulb to bias said battery from said bulb but complete one side of an electric connection therebetween, an aperture in the end of said compartment behind said battery, a finger-operated plunger seated against said battery and extending through said aperture to be manually depressed to force said battery into contact with the base of the bulb to complete the circuit therethrough, and a second mirror angularly positioned in said compartment behind said opening to reflect light from said bulb outwardly therethrough.

2. A compact as defined in claim 3, wherein said plunger includes a collar substantially the diameter of said aperture and the height of the spacing between the battery and the bulb, and a reduced portion extending outwardly from said collar so that said plunger may be moved inwardly and laterally to hook said collar behind the edge of said aperture to retain said battery in contact with said bulb, and said thimble is resiliently supported to accommodate excessive movement of the battery.

3. A compact comprising a container portion and a cover hinged thereto, a mirror within said cover spaced from the wall of said cover to form a compartment, said mirror having a cut out to form an opening in the lower portion thereof adjacent the surface of the container, a flash light within said compartment above the opening in the mirror, and a second mirror angularly positioned within the said compartment adjacent the opening in the mirror to reflect light from said flashlight outwardly above the surface of the container and beyond the first-mentioned mirror when the cover is in open position.

EARL M. BATES.
HANNAH BATES.

REFERENCES CITED

The following references are of record in the file of this patent:

UNITED STATES PATENTS

| Number | Name | Date |
|---|---|---|
| 1,464,552 | Warner | Aug. 14, 1923 |
| 1,742,958 | Kaufman | Jan. 7, 1930 |
| 1,875,650 | Pemberton | Sept. 6, 1932 |
| 2,159,934 | Preisz | May 23, 1939 |